May 24, 1927.　　　　　　　　　　　　　　　　　　　　1,629,731
E. C. PETERSON
VEHICLE LOCK
Filed July 28, 1923　　　　　　　5 Sheets-Sheet 1
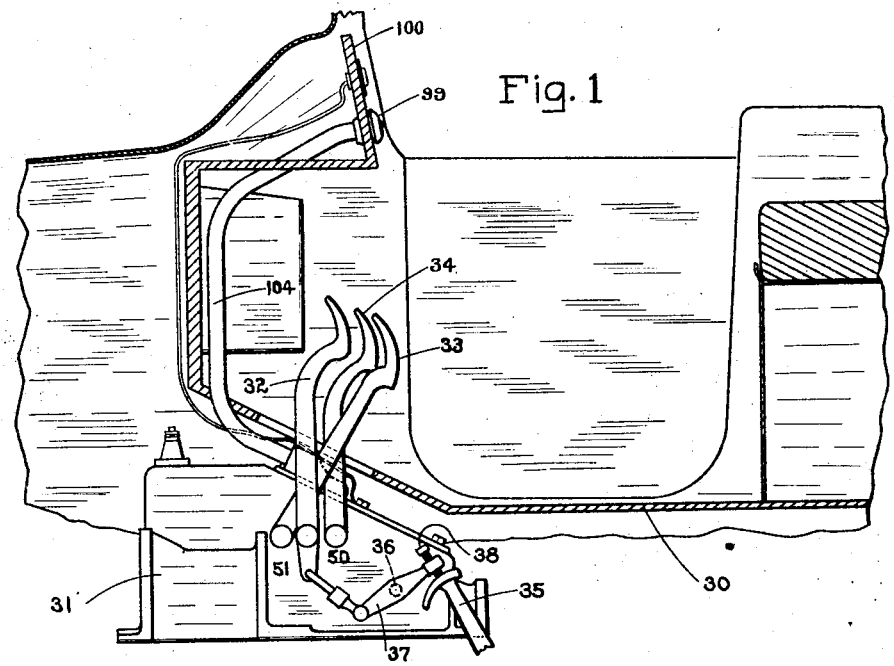
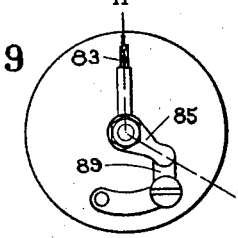
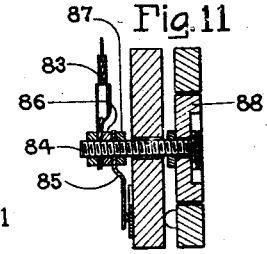
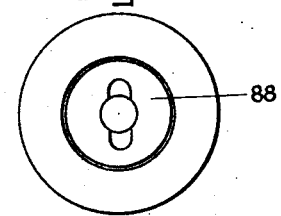
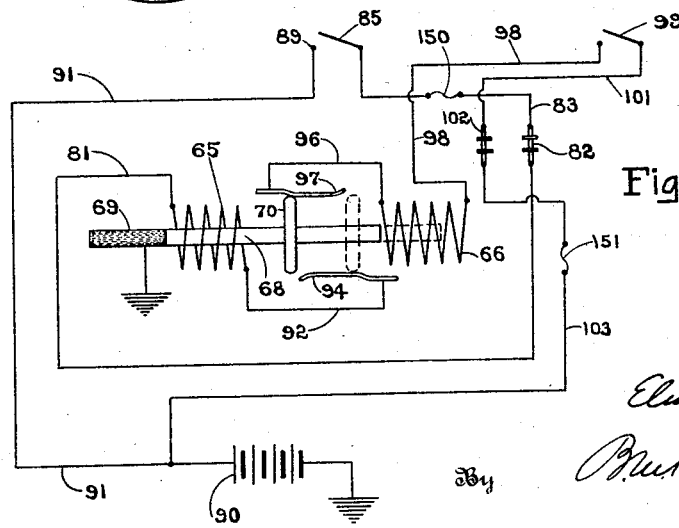
Inventor
Elmer C. Peterson
By B. M. Kent
Attorney May 24, 1927.
E. C. PETERSON
VEHICLE LOCK
Filed July 28, 1923
1,629,731
5 Sheets-Sheet 2
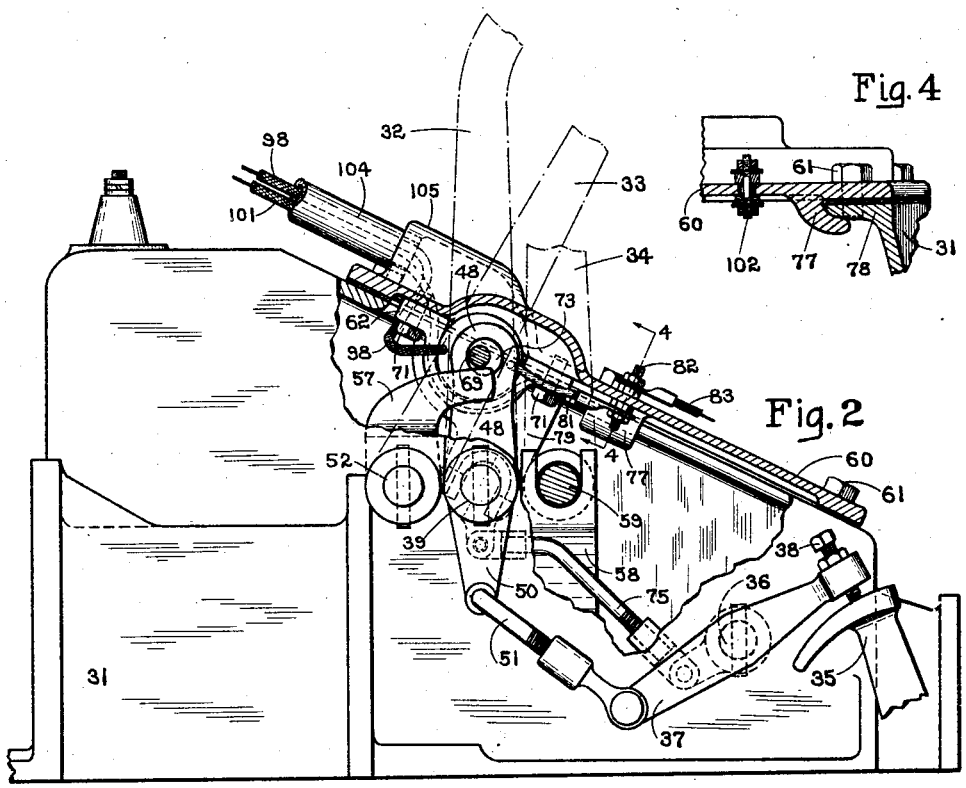
Fig. 4
Fig. 2
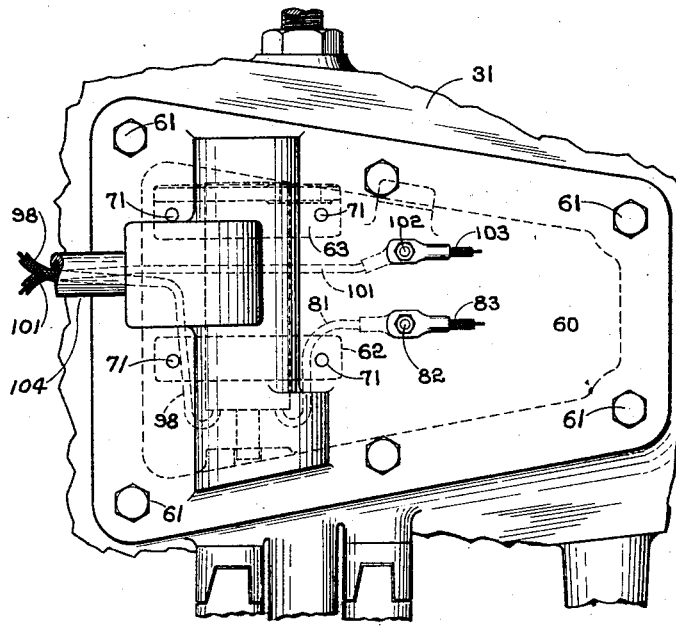
Fig. 3
Inventor
Elmer C. Peterson
By B. W. Kent
Attorney May 24, 1927.

E. C. PETERSON

VEHICLE LOCK

Filed July 28, 1923

Inventor
Elmer C. Peterson
by B. Kent
Attorney

May 24, 1927.  E. C. PETERSON  1,629,731
VEHICLE LOCK
Filed July 28, 1923   5 Sheets-Sheet 4

INVENTOR
Elmer C. Peterson
by B. W. Kent
ATTORNEY

May 24, 1927.  1,629,731
E. C. PETERSON
VEHICLE LOCK
Filed July 28, 1923   5 Sheets-Sheet 5
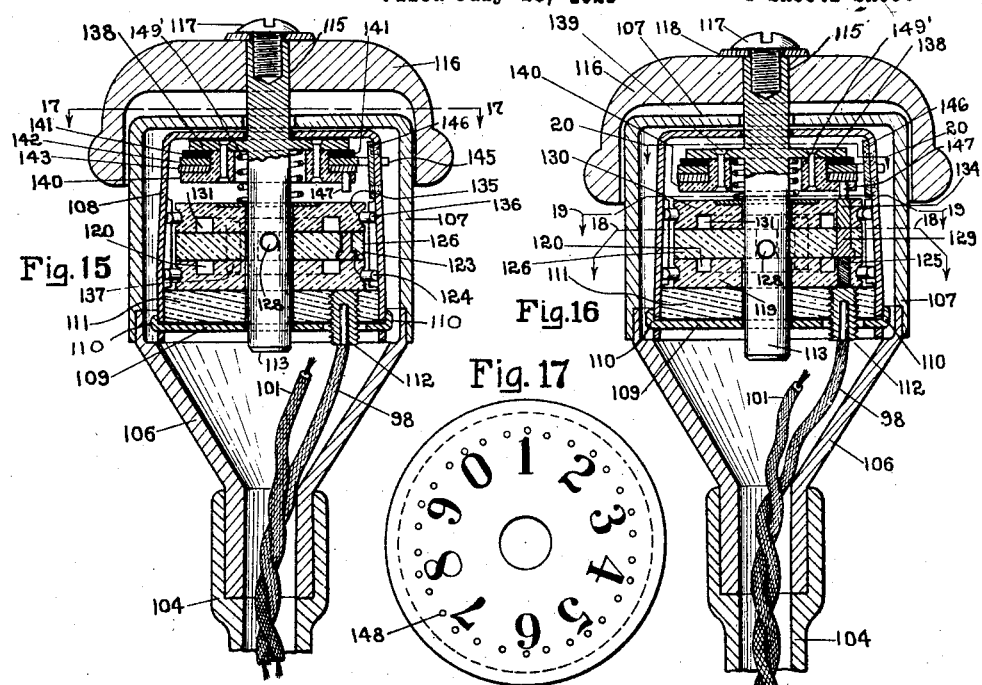
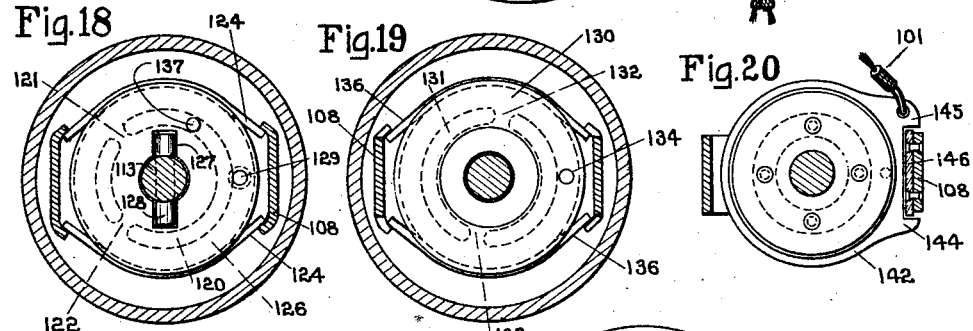
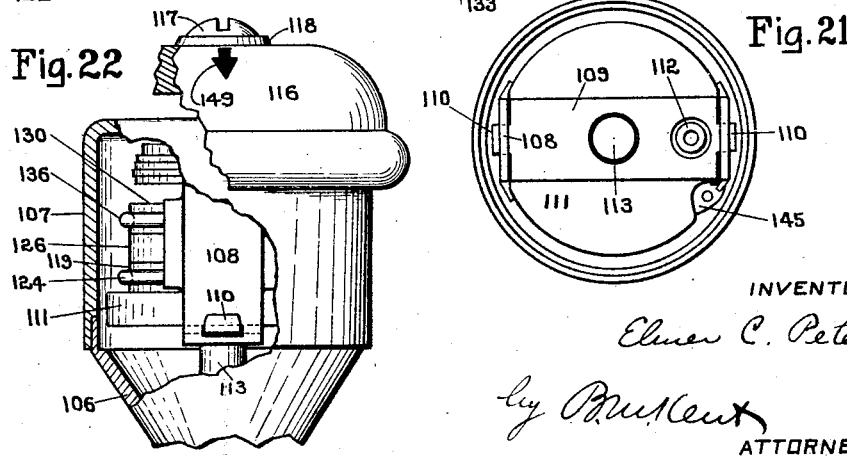
INVENTOR
Elmer C. Peterson
by B. M. Kent
ATTORNEY Patented May 24, 1927.

1,629,731

UNITED STATES PATENT OFFICE.

ELMER C. PETERSON, OF CLEVELAND, OHIO.

VEHICLE LOCK.

Application filed July 28, 1923. Serial No. 654,337.

This invention relates to locking devices for motor vehicles and more particularly to devices for locking the transmission mechanism of a Ford automobile, or other vehicle embodying a similar transmission, in neutral position so as to prevent the moving of the vehicle by its own motor.

One of the objects of the invention is to provide means adapted to be readily and conveniently actuated to lock the vehicle and very difficult to unlock, and also of such nature that it may not be readily circumvented.

A further object of the invention is to provide an electrically controlled locking device for the purpose specified, the locking operation of which is controlled by the operation of turning the ignition switch of the vehicle to the "off" position for the purpose of stopping the motor.

A further object of the invention is to provide an electrical locking and unlocking device which will cooperate with the transmission controls to prevent shifting of the controls from their neutral positions.

A further object of the invention is to provide a comparatively simple and efficient device of the kind described which will be durable and reliable and which may be manufactured at sufficiently low cost to meet commercial requirements.

Other objects and the features of novelty will be apparent from the following description, taken in connection with the accompanying drawings, of which:

Figure 1 is a diagrammatic view of a portion of a Ford automobile and its transmission mechanism, with my invention applied thereto;

Fig. 2 is a side elevation of a portion of the transmission housing with parts broken away to show details of one form of my invention, these details being as they appear from the line 2—2 of Fig. 6;

Fig. 3 is a fragmentary plan view of the housing shown in Fig. 2;

Fig. 4 is a detail section on the line 4—4 of Fig. 2;

Fig. 8 is a wiring diagram;

Fig. 9 is an elevation of one side of the usual ignition switch employed on the Ford automobile with modifications for use with my invention;

Fig. 10 is an elevation of the front of said switch;

Fig. 11 is a section on the line 11—11 of Fig. 9;

Fig. 15 is a longitudinal section through my improved combination switch for unlocking the mechanism, the parts being shown in a relation in which the vehicle is locked;

Fig. 16 is a view similar to Fig. 15, but showing the parts of the switch in the unlocking arrangement;

Fig. 17 is a plan view of the housing for said switch, as seen from the line 17—17 of Fig. 15;

Fig. 18 is a transverse section on the line 18—18 of Fig. 16;

Fig. 19 is a transverse section on the line 19—19 of Fig. 16;

Fig. 20 is a transverse section on the line 20—20 of Fig. 16;

Fig. 21 is a bottom plan of the switch mechanism, the view illustrating the parts as they would be seen if the conical part of the housing for the switch were removed; and Fig. 22 is a side elevation of the combination switch with a portion of the housing broken away to show some of the details in elevation.

Figure 5:
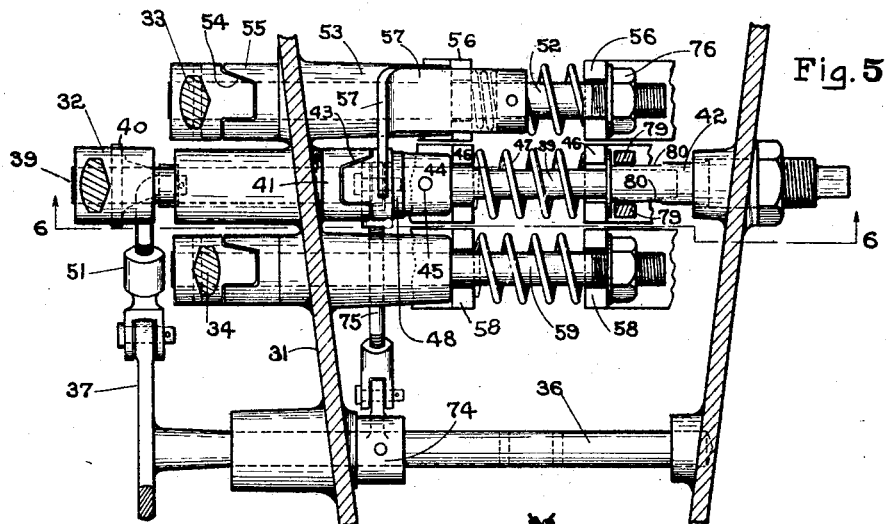
Fig. 5 is a plan view of the mechanism shown in Fig. 2, a portion of the housing being shown in section.

Referring to the drawings, and more particularly to Fig. 1, it may be noted at the outset, that a portion of the Ford automobile body is indicated at 30 and a portion of the transmission housing at 31. In the case of the Ford automobile, of which there are now several million in common use, the various component mechanisms have become so thoroughly standardized that practically all automobile mechanics and others skilled in the art understand the details of the construction and operation of these mechanisms. In view of the existing widespread knowledge as to the construction and operation of the various parts of the Ford automobile I have, in the drawings and in this specification, referred to such parts as my invention is concerned with, only in a general way, but I believe it will be found that the references to these parts are sufficiently definite to enable those skilled in the art to understand and practice my invention.

The Ford automobile employs the planetary type of transmission gearing and there are two forward speeds and one reverse speed which are controlled by the two pedals 32 and 33, the pedal 32 controlling the two forward speeds and the pedal 33 controlling the reverse speed. A third pedal 34 is provided, in connection with the pedals 32 and 33, for controlling the service brake with which the vehicle is equipped. The vehicle is also equipped with a hand brake (not shown) with which there is associated a cam lever 35. Mounted in the transmission housing is a shaft 36 which controls the high speed clutch of the transmission mechanism and a lever 37, mounted on the end of the shaft 36 outside of the housing 31, carries at one end a set screw 38 which cooperates with the cam lever 35 so that when the hand brake is set the lever 37 will be actuated by the cam lever 35 to release the clutch.

All of the features above referred to are fully illustrated and described in the "Ford Manual" published by the Ford Motor Company of Detroit, Michigan, and copyrighted in 1919.

The pedal 32 is secured on a shaft 39 by a pin 40 and the shaft 39 is supported at one end in a bearing sleeve 41 and has its opposite end supported in a socket in the adjustable screw 42. The sleeve 41 is provided with cam surfaces 43 with which complementary cam surfaces on the hub or dog 44 cooperate, the latter being pinned to the shaft 39 as indicated at 45. The usual brake band by which the low speed of the transmission is controlled, is indicated at 46 and the usual spring for separating the ends of the band, when inoperative, is shown at 47. I substitute for the usual dog 44, employed in the Ford transmission, another dog that is similar in all respects except that it is provided with the two arms 48 and 49, one projecting upwardly and the other downwardly.

Below the shaft 39, the pedal 32 carries an arm 50 which is connected with the lever 37 by means of the adjustable link 51. By this arrangement the clutch controlled shaft 36 is actuated simultaneously with the pedal 32 so that the latter may be employed to shift the clutch into its neutral position either for the purpose of disconnecting the engine from the propeller shaft of the vehicle or when the pedal is positioned to effect the drive through the low speed gearing.

The pedal 33, for controlling the reverse speed, is mounted on the end of the shaft 52 which is supported in a bearing 53 in the transmission housing 31. The hub of the pedal 33 is provided with cam surfaces 54 which cooperate with a dog 55 to draw the shaft 52 endwise when the pedal 33 is depressed. This endwise movement of the shaft 52 effects the contraction of the brake band 56 which, in turn, reverses the direction of rotation and provides for a reverse movement of the vehicle. I mount on the shaft 52 a lever 57 which is pinned to the shaft and located between the end of the brake band 56 and the end of the bearing 53, sufficient space being allowed between the hub and the end of the bearing 53 to provide for the necessary endwise movement of the shaft.

The service brake band is indicated at 58 and is actuated by the shaft 59 on which the pedal 34 is mounted, these parts not being changed in any respect from the standard arrangement employed in the Ford automobile.

Figure 6:
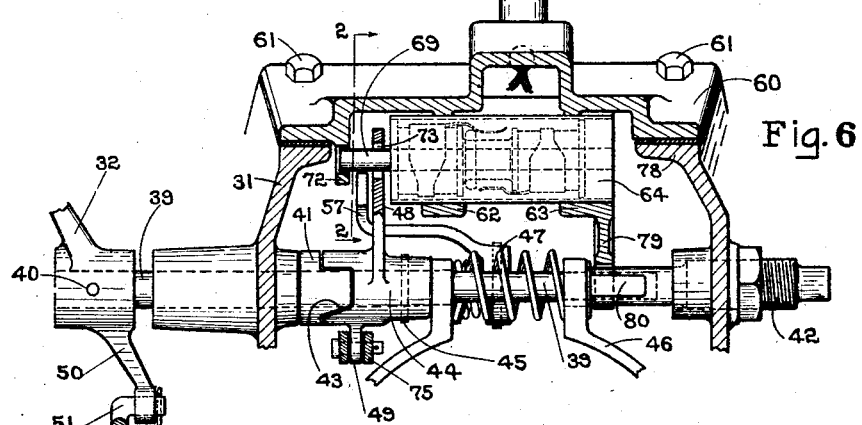
Fig. 6 is a transverse section on the line 6—6 of Fig. 5.
Figure 7:
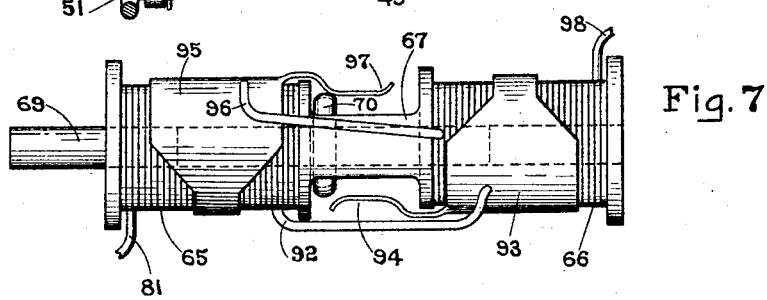
Fig. 7 is an enlarged side elevation of the lock.

I substitute for the standard transmission housing cover used in the Ford automobile, the special cover 60 which is secured in position, in the usual way, by bolts 61, but differs from the standard cover in that it carries on the interior, in the brackets 62 and 63, a tube 64, in which there is arranged the pair of axially aligned solenoids 65, 66 which are rigidly connected in fixed spaced relation by a pair of oppositely arranged connectors one of which is illustrated at 67 in Fig. 7. Associated with the solenoids 65 and 66 is a movable core or plunger 68, having an end portion 69, projecting from the solenoid 65 and formed of a non-magnetic metal (see Fig. 8). The core 68 carries, between the solenoids 65 and 66, a contact member 70 which is rigidly attached to the core and moves therewith. The brackets 62 and 63 are detachable from the cover and are secured thereto by the bolts 71, these brackets clamping the tube 64 in place. From Fig. 6 it will be noted that the cover 60 carries on its inner side a lug 72 having an aperture to receive the end 69 of the core of the solenoids. The arm 48, on the dog 44, has an aperture 73 through which the end 69 of the solenoid core passes. With the parts as shown in Fig. 6 it will be obvious that the end 69 of the solenoid core, on account of its projecting through the arm 48, serves as a locking bolt to prevent sufficient movement of the shaft 39 and pedal 32 to permit the operation of the low speed gearing of the transmission. Moreover the arm 48 is so positioned that the clutch, above referred to, is in the neutral position when the end 69 of the solenoid core is in the aperture 73. In other words, before the solenoid core can be positioned as illustrated in Fig. 6, to lock the lever 48, the pedal 32 must be depressed to the neutral position, the clutch being actuated through the medium of the arm 50 and connecting link 51, which actuate the lever 37. It will also be noted from Figs. 2, 5 and 6 that the lever 57 extends to a position beneath the end 69 of the solenoid core and when the latter is arranged as shown in Fig. 6, the reverse pedal 33 is locked so that the transmission gearing cannot be set for reverse operation of the vehicle. We thus see that the reverse and low speed pedals are locked to prevent operation of the vehicle either in low or reverse gear and, the clutch being held in neutral, as above described, prevents the operation of the vehicle by the direct or high speed gear. However, it might be possible for a thief to defeat the locking device by removing the link 51 which would unlock the clutch and permit the operation of the vehicle in high gear. To prevent this I have provided, inside the housing 31, a connecting means between the shafts 36 and 39, such connecting means consisting of the arm 49, on the dog 44, an arm 74 pinned on the shaft 36, and a connecting link 75 (see Figs. 2 and 5). With this arrangement the removal of the link 51 would not affect the locking of the clutch in the neutral position and thus the core of the solenoids will act as a bolt to lock all of the gearing controls, within the transmission housing, in neutral position and thereby prevent the vehicle from being driven by its own motor.

In order to make the lock still more effective, I deem it advisable to provide against the removal of the cover 60 and to also prevent the adjusting screw 42 from being turned to tighten the band 46. It will be appreciated that if the cover 60 is removed, the reverse gear band 56 may be tightened by means of the nut 76, without actuating the pedal 33 and it will also be possible to disconnect the link 75 which would permit the operation of the vehicle in high speed gear. To prevent the removal of the cover 60 I provide thereon a lug 77 (see Figs. 2 and 4) which is adapted to hook under the flange 78 on the transmission housing 31. This secures one side of the cover, even though the bolts 61 are removed and the opposite side will be secured by the end 69 of the core of the solenoids because of the connection with the arm 48. As a final means for preventing the operation of the vehicle by its own motor, when the transmission controls are locked, it is necessary to secure the screw 42 against adjustment. From the drawings, it will be evident that the same effect that is produced by actuating the pedal 32 to tighten the low speed band 46, may be obtained by tightening the screw 42 and therefore to completely lock the mechanism I provide suitable means for preventing turning of the screw 42, such means consisting of a lug 79 projecting downwardly from the bracket 63 and provided with a forked lower end which engages the flattened sides 80 of the screw 42 and prevents the turning of the latter.

The solenoid 65 may be termed the locking solenoid and the solenoid 66 may be termed the unlocking solenoid in that one shifts the core to the locking position and the other shifts it to the unlocked position. One terminal 81 of the solenoid 65 extends to the binding post 82 in the cover 60 and from the latter a wire 83 leads to a screw 84 that is associated with the ignition and light switch with which the Ford automobile is equipped. This switch is illustrated in Figs. 9, 10 and 11 and the screw 84 is a part that I add to the standard switch. I secure a contact finger 85 on the screw 84 by means of the nuts 86 and 87 and when the block 88 is turned to break the ignition circuit the finger 85 engages the contact 89 which is connected with the positive side of the storage battery 90 of the ignition system by a wire 91. The other terminal 92, of the solenoid 65, is connected to a band 93 that is secured around the solenoid 66 (see Fig. 7), the band 93 carrying a contact finger 94 with which the member 70 is adapted to engage. One terminal of the solenoid 66 is connected with a band 95, that is secured around the solenoid 65, by a wire 96 and the band 95 has a contact finger 97 that is adapted to be engaged by the member 70. The other terminal of the solenoid 66 is connected by a wire 98 with one of the terminals of a combination lock switch 99 arranged on the dash board 100 of the vehicle. The other terminal of the switch 99 is connected by a wire 101 with a binding post 102 on the cover 60 and this binding post is connected by a wire 103 with the positive side of the battery 90. The negative side of the battery 90 is grounded, as usual.

From Fig. 8 it will be seen that by closing the switch 99 the current will be caused to flow from the battery 90 through the solenoid 66, the finger 97, the member 70 and the core 68, the latter being grounded through contact with the metallic frame of the solenoids. The solenoid 66 will thus be energized and the core 68 will be drawn from the locking position, shown in Fig. 8, to the unlocking position, indicated in dotted lines. In this operation the member 70 will be shifted to the dotted position where it will contact with the finger 94 and be out of contact with the finger 97. Thus the end 69 of the core of the solenoids is withdrawn from the aperture 73 in the arm 48 and this arm, as well as the arm 57, will then be free, which will release the pedals 32 and 33 and permit the full use of the transmission controls to operate the vehicle as desired. When the ignition switch is in the closed position to permit the operation of the motor the finger 85 will not engage the contact member 89 and current will not flow through the solenoids 65 but, upon turning the ignition switch to the "off" position to stop the motor, the finger 85 is restored to the position shown in Fig. 9 where it engages with the contact member 89 and thus completes a circuit through the wires 91, 83, 81, the solenoid 65, the wire 92, the finger 94, member 70 and solenoid core 68, the latter being grounded as stated above. The solenoid 65 will thus be energized and the end 69 will be projected through the aperture 73 in the arm 48 and into the aperture in the lug 72, the latter acting as a support for the end of the core. This will again lock the mechanism, it being understood that the pedals 32 and 33 are in their neutral positions when the ignition switch is thrown to the "off" position.

From Fig. 8 it will be apparent that when the mechanism is locked, it might be unlocked by short circuiting the wires 98 and 101 which lead to the switch 99 and, therefore, in order to prevent a thief or other unauthorized person from short circuiting these wires I enclose them in a hardened steel tube 104, which has one end secured in a boss 105 on the cover 60 and the other end secured to the housing of the switch 99 (see Fig. 1).

While any suitable form of locking switch may be employed as the switch 99 I prefer to use a combination switch such as is illustrated in Figs. 15 to 22, inclusive. This consists of a housing which includes the conical portion 106 that is permanently secured in the upper end of the tube 104, and a substantially cylindrical portion 107 which is permanently secured to the large end of the portion 106. Within the housing formed by the parts 106 and 107 there is an inverted U-shaped member 108 that has its lower ends connected by a cross piece 109 having tangs 110 at its ends which project through openings in the member 108 and are bent over to secure these parts together (see Figs. 15 and 22).

A disc 111, of insulating material, having flattened sides, is arranged on the cross member 109 between the sides of the member 108 and carries a contact 112 which is threaded therein and to which the wire 98 is connected. A shaft 113 is arranged in central openings in the cross member 109 and disc 111 and projects through the upper end of the member 107 of the housing. Outside of the housing the shaft 113 has a squared end portion 115 on which a knob 116 of glass or other transparent material is secured by means of the screw 117 and washer 118.

Arranged on the disc 111 is a rotatable disc 119 in the upper surface of which there is an annular groove 120, which is preferably closed at the points 121 and 122 (see Fig. 18). The disc 119 is also provided with a peripheral groove 123 to receive the curved springs 124 which have their ends held by the member 108 and which act as frictional retarding devices for holding the disc 119 in any position to which it is adjusted. The disc 119 carries a contact pin 125 which is adapted to be aligned with the contact 112 (see Fig. 16).

Arranged on the disc 119 is a disc 126, also of insulating material, and having a centrally arranged transverse slot 127 to receive the cross-pin 128 in the shaft 113, this cross-pin serving as a driving connection between the shaft and the disc to permit the latter to be rotated by the shaft. The disc 126 carries a contact pin 129 that is adapted to be aligned with the pin 125.

Arranged on the disc 126 is a disc 130, of insulating material, having an annular groove 131 in its lower surface which is closed at the points 132 and 133 (see Fig. 19). The disc 130 carries a contact pin 134 adapted to be aligned with the pin 120 (see Fig. 16). The disc 130 has a peripheral groove 135 to receive the curved springs 136 which have their ends held by the member 108 (see Fig. 19) and serve as frictional retarders for holding the disc 130 in any position to which it is adjusted.

The disc 126 carries a pin 137 the ends of which project beyond the sides of the disc into the grooves 120 and 131 of the adjoining discs. By this arrangement the discs 119 and 130 may be rotated by the shaft 113 because of the engagement of the ends of the pin 137 with the stops 121 and 122 in the groove 120 and with the stops 132 and 133 in the groove 131, the grooves permitting a certain amount of rotation of the disc 126 independently of the discs 119 and 130 and of either of the latter independently of the other.

There is on the shaft 113 a collar or disc 138 to which there is secured, by rivets 139 or otherwise, a collar 140 of insulating material. The collar 140 carries an insulating ring 141 and two metallic rings 142 and 143. The rings 142 and 143 are in contact and the insulating ring 141 separates the ring 142 from the disc 138. The ring 142 has lugs 144 and 145 projecting therefrom and cooperating with the insulator 146, on the member 108, to hold the ring 142 against rotation. The ring 143 carries a downwardly projecting pin 147 which is adapted to be aligned with the pin 134 (see Fig. 16). The wire 101 connects with the lug 145, as shown in Fig. 20.

The top of the housing 107 is provided with a circle of figures, indicated in Fig. 17, and a series of equally spaced dots 148 between these figures, with which an index mark 149 on the knob 116 cooperates, the index 149 being preferably arranged on the interior of the knob so as to be close to the figures on the housing, and the knob, being transparent, will permit the index as well as the figures and marks 148, to be clearly seen. A spring 149' is arranged within the collar 140 and between the discs 130 and 138 and normally holds the knob 116 and shaft 113, together with the parts carried by the latter, in the raised position shown in Fig. 15.

In the operation of the switch, assuming that the parts are as shown in Fig. 15, the depression of the knob 116 would not form a connection between the wires 98 and 101 because the different contact pins are not in the alignment shown in Fig. 16. To effect the alignment of the contact pins, the knob 116 is turned to bring the index 149 to a predetermined position for the purpose of registering the contact pin 125 with the contact 112. The knob 116 is then rotated in the opposite direction to a predetermined position to bring the contact pin 134 in alignment with the pin 125. The knob 116 is then rotated in the reverse direction from the second operation to bring the contact pins 129 and 147 into alignment with the other contacts, as shown in Fig. 16. By depressing the knob 116 the pin 147 will be made to contact with the pin 134 and the pressure exerted on the knob 116 will also effect a contact between the pins 134 and 129 and between the latter and the pin 125 and between this pin 125 and the member 112, thus completing a circuit between the wires 98 and 101. If the knob 116 is then rotated there will be a disalignment of the several contact pins and it will no longer be possible to complete the circuit of wires 98 and 101, without resetting the combination. The springs 124 and 136 hold the discs 119 and 130 in their respective positions, after being set, and the engagement of the pin 137 with the stops 121, 122, 132 and 133 will permit the knob 116 to be rotated for the purpose of setting the discs 119 and 130.

In the operation of the locking mechanism, when it is desired to lock the transmission the pedals 32 and 33 are set in their neutral positions. Ordinarily the reverse pedal 33 stands in the neutral position so that it is only necessary to depress the pedal 32 to the neutral position and, when this has been done, the ignition switch lock 88 is turned to the "off" position which carries the contact finger 85 into engagement with the contact 89 and completes a circuit through the locking solenoid 65, it being assumed that the core 68 has stood in the dotted position indicated in Fig. 8, which would provide a contact between the member 70 and the finger 94. The solenoid 65 being thus energized will draw the core 68 to the full line position shown in Fig. 8, which is the position shown in Fig. 6, where it will lock the arms 48 and 57 and thus secure all of the transmission mechanism in the neutral arrangement and prevent the vehicle from being driven by its own motor. The movement of the core 68, as just described, will carry the member 70 out of contact with the finger 94 and thus interrupt the flow of current through the solenoid 65 and avoid a drain on the battery 90 and also avoid the possibility of burning out the solenoid 65. As a further protection against burning out the solenoid 65 I may employ a fuse 150 which will be blown in a case of a prolonged flow of current through the solenoid 65. The fuse 150 will, of course, be of such capacity that it will blow before the solenoid is damaged. As a protection to the solenoid 66 I may also employ a similar fuse 151 in the circuit of that solenoid.

When it is desired to unlock the transmission mechanism, the combination switch 99 is set, as above described, and the knob 116 is then depressed to complete the circuit through the solenoid 66. The latter will be thereby energized and draw the core 68 to the right, in Fig. 8, which will release the arms 48 and 57 and permit the actuation of all of the transmission controls, as desired. As the core 68 moves to the right in Fig. 8, the member 70 is disengaged from the finger 98 but engages the finger 94 so as to be set for the subsequent locking operation.

Figure 12:
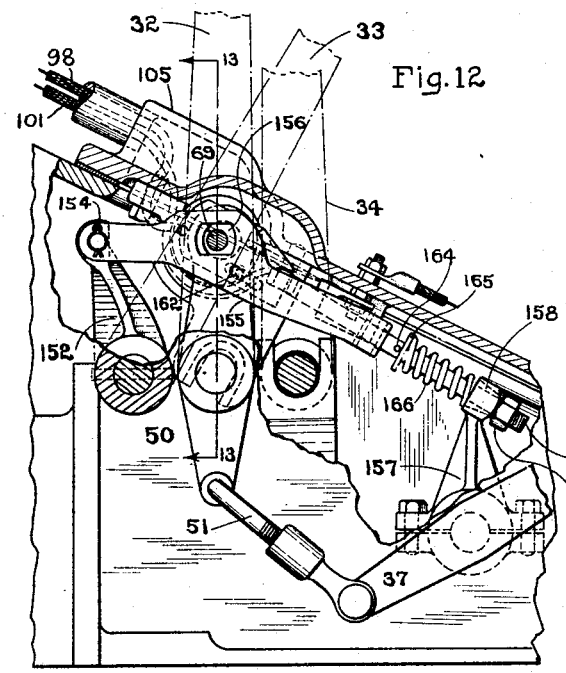
Fig. 12 is a fragmentary side elevation of the transmission housing with parts broken away to show the details of another form of my invention.
Figure 13:
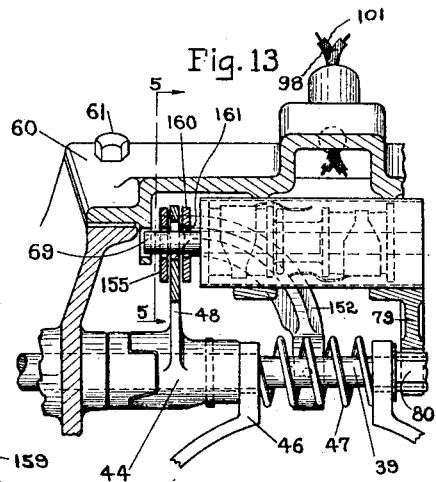
Fig. 13 is a vertical section on the line 13—13 of Fig. 12.
Figure 14:
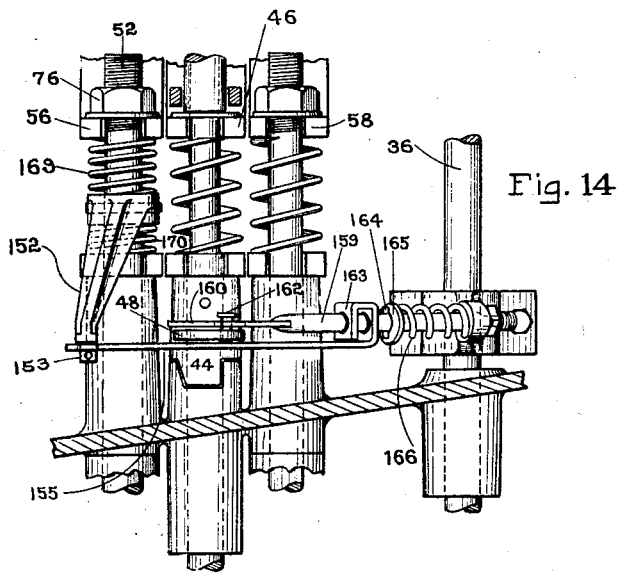
Fig. 14 is a plan view of the mechanism shown in Figs. 12 and 13, with the portion of the housing shown in section.

In Figs. 12, 13 and 14 I have illustrated a different arrangement of parts for locking the control levers. The solenoids 65 and 66 are arranged on the interior of the cover 60 as in the arrangement above described, and the dog 44 has the arm 48, as before. In place of the arm 57, on the shaft 52, I provide an arm 152 having a stud 153 at its outer end which projects through an opening in a plate 155 which has an eye 156 to receive the locking bolt 69. The plate 155 is secured on the stud 153 by means of a cotter pin 154. There is clamped on the shaft 36 an arm 157 having an eye 158 on its outer end for the bolt 159. The bolt 159 carries a plate 160 having an opening 161 for the locking bolt 69 (see Fig. 13). The arm 48 carries a pin 162 which passes through an elongated slot in the plate 160 to support the latter and at the same time permit the longitudinal movement of the bolt 159, resulting from actuating the shaft 36. The plate 155 has a lateral extension 163 through which the bolt 159 passes and whereby the plate 155 is supported. A pin 164 extends transversely through the bolt 159 and backs up a washer 165 between which and the outer end of the arm 157 there is a spring 166 to hold the bolt 159 with the nut 167 against the end of the arm 157. From Fig. 12 it will be evident that without the spring 166 the bolt 159 would tend to slide downwardly to the right and when thus displaced would interfere with the operation of the locking bolt 69. It will be noted that the hub of the arm 152 is so positioned on the shaft 52 as to permit the necessary axle movement of this shaft, springs 169 and 170 being arranged on opposite sides of this hub to spread the ends of the brake band 56.

The operation of this form of the mechanism, which I might add at this point is my preferred form, is similar to that of the other form and a repetition of this is, therefore, deemed unnecessary. The locking bolt 69, on account of passing through the openings in the plates 155 and 160, when in the locking position holds the arms 152 and 157, and shafts carrying them, in their neutral positions.

It will be evident to those skilled in the art that the principles of my invention may be applied to the Ford transmission by means differing in detail from the forms of the invention I have illustrated and it is, therefore, to be understood that the drawings and specifications are to be taken merely as illustrations of the principles of the invention which is defined in the appended claims.

Having thus described my invention, what I claim is:

1. In apparatus of the class described, the combination of a transmission mechanism, a housing therefor, a rocking control-shaft in said housing, an arm secured on said shaft within said housing, a locking member movable into the path of said arm to prevent the movement of said shaft, and electromagnetic means for actuating said member.

2. In apparatus of the class described, the combination of a transmission mechanism, a housing therefor, a plurality of rocking shafts for controlling different operating arrangements of said mechanism, an arm secured on each of said shafts within said housing, and locking means cooperating with said arms to lock said shafts in their respective neutral positions.

3. In apparatus of the class described, the combination of a transmission mechanism, a housing therefor, a plurality of rocking shafts for controlling different operating arrangements of said mechanism, an arm on each of said shafts within said housing, a bolt within said housing movable to and from a position in which it cooperates with said arms to hold said shafts in their respective neutral positions, and electromagnetic means for actuating said bolt.

4. In locking devices of the class described, the combination of a transmission mechanism, a housing therefor including a removable coverplate, a plurality of shafts for controlling different operating arrangements of said mechanism, an arm on each of said shafts within said housing, and means carried on the inside of said coverplate for cooperation with said arms to lock said shafts in their respective neutral positions and also to lock said coverplate against removal.

5. In apparatus of the class described, the combination of a system of planetary transmission gearing for controlling the speed and direction of movement of a motor vehicle, a housing for said gearing, a coverplate on said housing, a plurality of shafts for controlling different operating arrangements of said gearing, a clutch, a shaft for controlling said clutch, a locking bolt, and means whereby said bolt locks all of said shafts against movement and said coverplate against removal.

6. In apparatus of the class described, the combination of a system of planetary transmission gearing for controlling the speed and direction of movement of a motor vehicle, a housing for said gearing, a coverplate on said housing, a plurality of shafts for controlling different operating arrangements of said gearing, a clutch, a shaft for controlling said clutch, a locking bolt, means whereby said bolt locks all of said shafts against movement and said coverplate against removal, and electromagnetic means for actuating said bolt.

7. In apparatus of the class described, the combination of a system of planetary transmission gearing for controlling the speed and direction of movement of a motor vehicle, a housing for said gearing, a plurality of shafts for controlling different operating arrangements of said gearing, a clutch, a shaft for controlling said clutch, a locking bolt, means whereby said bolt locks all of said shafts against movement, and electromagnetic means for actuating said bolt.

8. In apparatus of the class described, the combination of a system of planetary transmission gearing for controlling the speed and direction of movement of a motor vehicle, a housing for said gearing, a plurality of shafts for controlling different operating arrangements of said gearing, a clutch, a shaft for controlling said clutch, means for connecting the last-mentioned shaft and one of said plurality of shafts within said housing to cause said shafts to be moved simultaneously, a locking bolt, and means whereby said bolt locks each of said plurality of shafts against movement.

9. In apparatus of the class described, the combination of a system of planetary transmission gearing for controlling the speed and direction of movement of a motor vehicle, a housing for said gearing, a plurality of shafts for controlling different operating arrangements of said gearing, a clutch, a shaft for controlling said clutch, means for connecting the last-mentioned shaft and one of said plurality of shafts within said housing to cause said shafts to be moved simultaneously, a locking bolt, means whereby said bolt locks each of said plurality of shafts against movement, and electromagnetic means for actuating said bolt.

10. In apparatus of the class described, the combination of a system of planetary transmission gearing for controlling the speed and direction of movement of a motor vehicle and comprising low-speed gearing, reverse gearing and a clutch for controlling high speed, a housing for said gearing, three shafts in said housing one of which controls said low speed gearing, the second of which controls said reverse gearing and the third of which controls said clutch, means within said housing connecting the first and third of said shafts for simultaneous movement, arms on the first and second of said shafts, a locking bolt on the interior of said housing adapted to cooperate with said arms to prevent movement of the first and second of said shafts when they are in their neutral positions, and actuating means for said bolt.

11. In apparatus of the class described, the combination of a system of planetary transmission gearing for controlling the speed and direction of movement of a motor vehicle and comprising low-speed gearing, reverse gearing and a clutch for controlling high speed, a housing for said gearing, three shafts in said housing one of which controls said low speed gearing, the second of which controls said reverse gearing and the third of which controls said clutch, means within said housing connecting the first and third of said shafts for simultaneous movement, arms on the first and second of said shafts, a locking bolt on the interior of said housing adapted to cooperate with said arms to prevent movement of the first and second of said shafts when they are in their neutral positions, and electromagnetic means for actuating said bolt.

12. In apparatus of the class described, the combination of a system of planetary transmission gearing for controlling the speed and direction of movement of a motor vehicle and comprising low-speed gearing, reverse gearing and a clutch for controlling high speed, a housing for said gearing, three shafts in said housing one of which controls said low speed gearing, the second of which controls said reverse gearing and the third of which controls said clutch, means within said housing connecting the first and third of said shafts for simultaneous movement, arms on the first and second of said shafts, a coverplate for said housing, a bolt on the interior of said housing cooperating with said arms to prevent movement of the first and second said shafts when they are in their neutral positions and lock the same and said coverplate, and actuating means for said bolt.

13. In apparatus of the class described, the combination of a system of planetary transmission gearing for controlling the speed and direction of movement of a motor vehicle, a housing therefor, shafts for controlling the different operating arrangements of said gearing, means within said housing for locking all of said shafts against movement, adjusting means for said gearing projecting through said housing so as to be adjustable from the exterior thereof, and means on the interior of the housing for locking said means against adjustment from the exterior.

14. In apparatus of the class described, the combination of a system of planetary transmission gearing for controlling the speed and direction of movement of a motor vehicle, a housing therefor, shafts for controlling the different operating arrangements of said gearing, means within said housing for locking all of said shafts against movement, adjusting means for said gearing projecting through said housing so as to be adjustable from the exterior thereof, a coverplate for said housing, and means on the interior of said cover plate for locking said means against adjustment from the outside.

15. In apparatus of the class described, the combination of a system of planetary transmission gearing for controlling the speed and direction of movement of a motor vehicle, a housing therefor, shafts for controlling the different operating arrangements of said gearing, a coverplate for said housing, and means on said coverplate for locking all of said shafts against movement and for locking said coverplate against removal.

16. In apparatus of the class described, the combination of a system of planetary transmission gearing for controlling the speed and direction of movement of a motor vehicle, a housing therefor, shafts for controlling the different operating arrangements of said gearing, a coverplate for said housing, adjusting means for said gearing projecting through said housing and adapted to be actuated from the exterior, means on said coverplate for locking all of said shafts against movement and for locking said coverplate against removal, and additional means on said coverplate for locking said adjusting means.

In testimony whereof I affix my signature.

ELMER C. PETERSON.